UNITED STATES PATENT OFFICE.

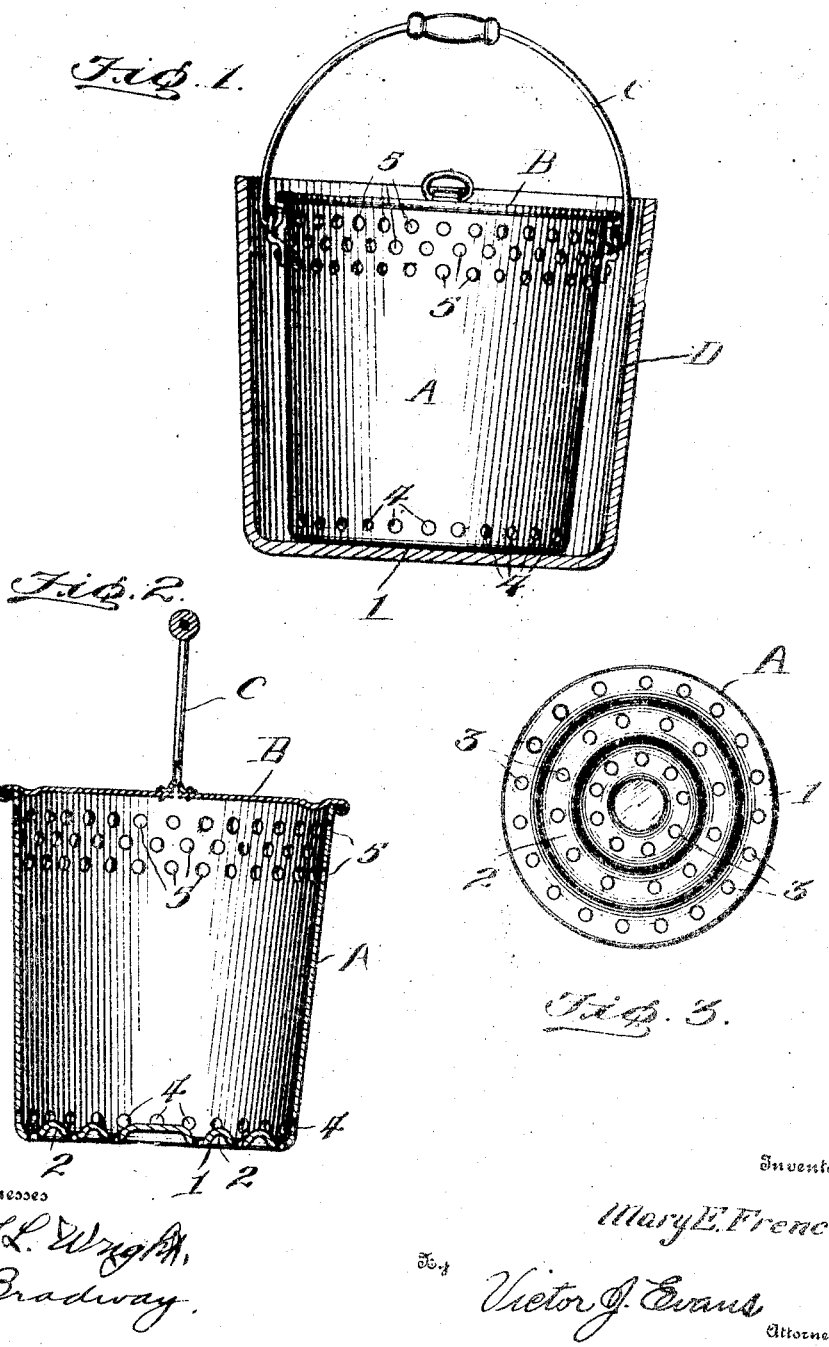

MARY E. FRENCH, OF CLYDE, OHIO.

KETTLE.

No. 905,685.   Specification of Letters Patent.   Patented Dec. 1, 1908.

Application filed October 17, 1907. Serial No. 397,908.

*To all whom it may concern:*

Be it known that I, MARY E. FRENCH, a citizen of the United States, residing at Clyde, in the county of Sandusky and State of Ohio, have invented new and useful Improvements in Kettles, of which the following is a specification.

This invention relates to cooking kettles more particularly of that type in which an inner steaming kettle is employed within an outer water-containing vessel.

The invention has for one of its objects to provide an inner kettle for use in the manner referred to and so designed that the kettle can be employed in connection with any ordinary kettle of appropriate size, thereby rendering it unnecessary for a person to buy an extra outer kettle.

A further object of the invention is to improve and simplify the construction of devices of the character referred to so as to be comparatively easy and inexpensive to manufacture and efficient and satisfactory in service.

With these objects in view and others, as will appear as the description proceeds, the invention comprises the various novel features of construction and arrangement of parts which will be more fully described hereinafter and set forth with particularity in the claim appended hereto.

In the accompanying drawing, which illustrates one of the embodiments of the invention, Figure 1 is a side elevation of the kettle. Fig. 2 is a central vertical section thereof. Fig. 3 is a bottom plan view of the kettle.

Similar reference characters are employed to designate corresponding parts throughout the several views.

Referring to the drawing, A designates a vessel of any appropriate shape and preferably composed of sheet metal pressed into the desired form. The bottom 1 is formed with corrugations 2 which may be circular, as shown, or of any other arrangement and in the bottom or trough of each corrugation are apertures 3 through which water can freely enter the vessel and circulate therethrough, there being one or more rows of apertures 4 in the side of the vessel adjacent the bottom for permitting circulation into or out of the vessel in a horizontal direction. By arranging the perforations 3 in the troughs of the corrugations, every particle of water will drain out of the vessel when the latter is removed so that the potatoes, corn or other vegetables can be thoroughly dried. In the side of the vessel A adjacent the top are perforations 5 which, when the cover B is in position permit the steam to pass out laterally and strike against the outside kettle so as to be condensed by the comparatively cold walls thereof and flow back into the outer vessel. Attached to the kettle is a swinging bail C for convenience in lifting the same and the cover B may be of any approved form to fit the vessel. In practice, the food to be steamed or cooked is placed in the vessel and covered by the lid B, after which the vessel is placed in the outer pail D, that contains water to a suitable depth. The water enters the inner vessel through the perforations 3 and 4 and during the boiling, the water circulates freely through these openings. The steam rising in the inner vessel passes out through the apertures 5 and the part of the steam that condenses flows back into the outer vessel.

The device is of comparatively simple and inexpensive construction and is so designed that it can be readily used in connection with pails of appropriate shape.

Having thus described the invention, what I claim is:—

The combination of an outer vessel open at its top, with an inner vessel comprising a body having a corrugated bottom resting directly on the bottom of the outer vessel and provided with internal corrugations serving to support the food in the vessel at a height to permit water to circulate under the same, said corrugations having apertures in their bottoms, the body being of less height than the outer vessel and having apertures in its side adjacent the bottom and also adjacent the top, an imperforate cover resting on the inner vessel and disposed within the outer vessel and arranged to constitute a deflector located immediately above the upper openings of the inner vessel for directing steam outwardly through such openings to impinge on the outer vessel to condense by the relatively cold surface of the latter, the outer vessel being of such diameter as to provide an annular space between it and the inner vessel.

In testimony whereof, I affix my signature in presence of two witnesses.

MARY E. FRENCH.

Witnesses:
  EUGENE MATTHEWS,
  H. G. GIBBONS.